(12) United States Patent
Maus

(10) Patent No.: US 8,997,455 B2
(45) Date of Patent: Apr. 7, 2015

(54) DEVICE AND METHOD FOR TREATING EXHAUST GAS CONTAINING PARTICLES AND MOTOR VEHICLE HAVING THE DEVICE AND PERFORMING THE METHOD

(75) Inventor: Wolfgang Maus, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 105 days.

(21) Appl. No.: 13/329,666

(22) Filed: Dec. 19, 2011

(65) Prior Publication Data

US 2012/0102926 A1 May 3, 2012

Related U.S. Application Data

(63) Continuation of application No. PCT/EP2010/057494, filed on May 28, 2010.

(30) Foreign Application Priority Data

Jun. 17, 2009 (DE) .......................... 10 2009 025 136

(51) Int. Cl.
*F01N 3/00* (2006.01)
*F01N 3/01* (2006.01)
(Continued)

(52) U.S. Cl.
CPC ................ *F01N 3/01* (2013.01); *F01N 3/0222* (2013.01); *F01N 13/009* (2013.01);
(Continued)

(58) Field of Classification Search
CPC ......... F01N 3/01; F01N 3/0222; F01N 13/02; F01N 2240/04; F01N 2330/02; F01N 2330/10; F01N 2330/12; F01N 2330/22; F01N 2240/28

USPC ..................................................... 60/275, 295
See application file for complete search history.

(56) References Cited

U.S. PATENT DOCUMENTS 4,205,969 A  6/1980  Matsumoto
4,304,096 A * 12/1981  Liu et al. ........................ 60/274
(Continued)

FOREIGN PATENT DOCUMENTS

DE   10 2005 022 046 A1   12/2005
DE   10 2008 057 960 A1   5/2010
(Continued)

OTHER PUBLICATIONS

English translation of Japanese Patent Application Publication No. JP 2003-269134A (Sep. 25, 2003).*

(Continued)

*Primary Examiner* — Jason Shanske
(74) *Attorney, Agent, or Firm* — Laurence A. Greenberg; Werner H. Stemer; Ralph E. Locher

(57) ABSTRACT

A method and a device for treating exhaust gas containing particles, include a particle separator and at least one particle agglomeration device positioned upstream of the particle separator in exhaust gas flow direction. The particle agglomeration device includes at least one apparatus for forming an electrical field and a particle buffer storage device, through which the exhaust gas can flow. The particles are stored on top of each other at the particle buffer storage device in such a way that particle agglomerates are formed, which are removed from the particle buffer storage device again after a short period of time and supplied to the particle separator for conversion. A motor vehicle having the device and performing the method is also provided.

18 Claims, 3 Drawing Sheets

(51) Int. Cl.
*F01N 3/022* (2006.01)
*F01N 13/00* (2010.01)

(52) U.S. Cl.
CPC ........ *F01N 2240/04* (2013.01); *F01N 2240/28* (2013.01); *F01N 2330/02* (2013.01); *F01N 2330/10* (2013.01); *F01N 2330/12* (2013.01); *F01N 2330/22* (2013.01); *Y02T 10/20* (2013.01)

(56) References Cited

U.S. PATENT DOCUMENTS

| | | | |
|---|---|---|---|
| 4,338,784 A * | 7/1982 | Liu et al. | 60/274 |
| 4,406,119 A | 9/1983 | Kamiya et al. | |
| 4,871,515 A | 10/1989 | Reichle et al. | |
| 5,557,923 A * | 9/1996 | Bolt et al. | 60/274 |
| 6,168,689 B1 | 1/2001 | Park et al. | |
| 2005/0031513 A1 * | 2/2005 | McNamara et al. | 423/215.5 |
| 2005/0056977 A1 * | 3/2005 | Figoutz et al. | 266/157 |
| 2006/0187609 A1 * | 8/2006 | Dunn | 361/230 |
| 2006/0266022 A1 * | 11/2006 | Woerner et al. | 60/295 |
| 2007/0000236 A1 * | 1/2007 | Naito et al. | 60/275 |
| 2007/0175208 A1 * | 8/2007 | Bandl-Konrad et al. | 60/286 |
| 2011/0214413 A1 | 9/2011 | Hodgson et al. | |

FOREIGN PATENT DOCUMENTS

| | | |
|---|---|---|
| EP | 0 299 197 A2 | 1/1989 |
| JP | 57-148017 A1 | 9/1982 |
| JP | 2003269134 A | 9/2003 |
| JP | 2006342730 A | 12/2006 |
| KR | 100148563 B1 | 10/1998 |
| WO | 2010/057779 A1 | 5/2010 |

OTHER PUBLICATIONS

English translation of Japanese Patent Application Publication No. JP 2006-342730A (Dec. 21, 2006).*
International Search Report of PCT/EP2010/057494, Dated Sep. 23, 2010.
Written Opinion of the International Searching Authority.

* cited by examiner

DEVICE AND METHOD FOR TREATING EXHAUST GAS CONTAINING PARTICLES AND MOTOR VEHICLE HAVING THE DEVICE AND PERFORMING THE METHOD

CROSS-REFERENCE TO RELATED APPLICATION

This is a continuation, under 35 U.S.C. §120, of copending International Application No. PCT/EP2010/057494, filed May 28, 2010, which designated the United States; this application also claims the priority, under 35 U.S.C. §119, of German Patent Application DE 10 2009 025 136.7, filed Jun. 17, 2009; the prior applications are herewith incorporated by reference in their entirety.

BACKGROUND OF THE INVENTION

Field of the Invention

The present invention relates to a device and a method for treating exhaust gas containing particles, including a particle agglomeration device and a particle separator. The invention can be used, in particular, in the field of exhaust-gas treatment for mobile internal combustion engines, such as for example diesel engines. The invention also relates to a motor vehicle having the device and performing the method.

The combustion of gasoline or diesel forms not only, for example, carbon monoxide, hydrocarbons and nitrogen oxide but also so-called soot particles. It is sought to further reduce the emissions of particles in motor vehicles due to the health hazard posed by such particles and a range of existing legal regulations.

In the past, a so-called wall-flow filter, which was usually constructed as an extruded ceramic structure, was often used for that purpose. In a wall-flow filter, inlets and outlets of a multiplicity of channels are closed off at alternate sides. In that way, the exhaust gas was able to enter into some of the channels and was then forced entirely through a porous channel wall due to the closures. Through the use of a corresponding selection of the porosity of the channel wall, it was possible to attain very high levels of effectiveness during the separation of particles. It is a problem, however, that such wall-flow filters may become blocked if too many particles have accumulated and a regeneration is not triggered in due time. Furthermore, such wall-flow filters generate a considerable back pressure in the exhaust system, which is associated, for example, with a power loss of the internal combustion engine.

So-called partial-flow filters have also been developed in order to counteract the back pressure problem and to likewise permit particle separation within the scope of the legal regulations. In those filters, the channels are not completely closed off, so that it is always possible for a partial flow to flow onward through the channel. Diversions, guide blades, openings and the like, for example, are provided in the channels in order to cause a (partial) flow through a filter material through the use of pressure differences in adjacent channels. In that case, a multiplicity of such diversions are usually provided over the length of the channel in order to attain a deflection of the particles or of the exhaust gas under favorable conditions of the surrounding filter material and to realize a partial flow if, for example, the filter material is already full in that case.

It is known to use a discontinuous and/or continuous regeneration for the regeneration of such wall-flow filters or partial-flow filters. In the case of discontinuous regeneration, it is provided that the soot is burned as a result of a targeted introduction of heat into the particle separator. For that purpose it is, for example, possible for quantities of unburned fuel to be dispensed onto a catalytically active coating in the exhaust system, wherein an exothermic reaction takes place which heats the exhaust gas or the particle separator to temperatures adequate for the oxidation of soot. The continuous process, also referred to as a CRT (continuous regeneration trap) process, uses nitrogen dioxide ($NO_2$) for converting the soot. For that purpose, the nitrogen monoxide in the exhaust gas is oxidized using a catalyst which has an oxidizing effect, and using air or oxygen, to form nitrogen dioxide which is subsequently supplied to the soot. In that case, a conversion of the soot takes place even at very low temperatures, such as for example merely at temperatures above 250° C.

Furthermore, it has also already been proposed for the particles in the exhaust-gas flow to be electrically charged using an electric field generated through the use of an electrode pair and to be transported to a separation electrode.

However, the known systems have in part not been consistently satisfactory with regard to their separation action, their regeneration and/or their influence on the operation of the internal combustion engine. Furthermore, those concepts are in part highly complex and accordingly expensive.

SUMMARY OF THE INVENTION

It is accordingly an object of the invention to provide a device and a method for treating exhaust gas containing particles and a motor vehicle having the device and performing the method, which overcome the hereinafore-mentioned disadvantages and at least partially solve the highlighted problems of the heretofore-known devices, methods and vehicles of this general type. In particular, it is sought to specify a device and a method for treating particles in such a way that a high separation action of an exhaust system is possible even with a low pressure loss.

With the foregoing and other objects in view there is provided, in accordance with the invention, a device for treating exhaust gas having particles. The device comprises a particle separator and a particle agglomeration device positioned upstream of the particle separator in exhaust gas flow direction. The particle agglomeration device has at least one apparatus for generating an electric field and a particle buffer storage device through which the exhaust gas can flow.

The device treats, in particular, the exhaust gas of mobile internal combustion engines such as, for example, diesel engines. The particles are, in particular, primarily soot particles, although other particles may likewise also be referred to in this case.

A particle agglomeration device and a particle separator are provided (preferably directly) in series in the flow direction of the exhaust gas. It is also possible in this case, for example if multiple exhaust tracts are provided, for a corresponding device to be provided for each of the exhaust tracts. Furthermore, it is also possible for only a part of the exhaust gas to be treated through the use of a corresponding device.

The particle agglomeration device serves to increase the size of particles produced by the internal combustion engine and contained in the exhaust gas. For this purpose, through the use of an electric field, the particles are deposited in a targeted manner on a particle buffer storage device, wherein the particles come to rest on top of each other and increase in size due to their tendency to adhere to one another. When the particles at the particle buffer storage device have reached a desired size, they are entrained again by the exhaust gas and supplied to the downstream particle separator. As a result of the targeted agglomeration of a plurality of particles, the particle separator can now be constructed so as to have a corresponding separation efficiency for the larger particle agglomerates. This, in particular, also has the result that the downstream particle separator may have a more "open" construction, wherein the problems associated with the increasing pressure loss in the case of a filter becoming increasingly blocked can be considerably reduced.

With regard to the apparatus for generating an electric field, it should also be noted that, in this case, the particles to be agglomerated are charged in an electrostatic field and, due to their charge, move with greater intensity toward the particle buffer storage device and/or one another.

In accordance with another feature of the invention, it is very particularly preferable for the particle buffer storage device to be connected to an electrical pole. In this way, it is the case, in particular, that a force is exerted on the ionized particles, in such a way that they accumulate with greater intensity and in a concentrated manner on the particle buffer storage device. The surfaces of the particles have very good adhesive properties in relation to other particles, in such a way that the particle agglomerates firmly adhere to one another even after a deionization. For this purpose, the particle buffer storage device is connected to the electrical pole having a charge which opposes that of the particles. As a further effect, it is to be noted that the retention forces of the particle agglomerates on the particle buffer storage device are also reduced in this way, in such a way that it is ensured that the particle agglomerates are promptly torn away again by the exhaust-gas flow. The now relatively large, electrically neutral particle agglomerates are supplied to the particle separator, wherein in this case, electrostatic effects substantially no longer occur and uniform utilization of the particle separator is ensured.

In accordance with a further feature of the invention, it is proposed that the particle buffer storage device has at least one open structure with a multiplicity of passages. As already stated above, the exhaust gas can flow through the particle buffer storage device. This is intended to mean not a simple pipe section but rather a device which opposes the exhaust-gas flow and through the wall of which the exhaust gas itself flows. An open structure with a multiplicity of passages is proposed in this case, in particular. This is intended, in particular, to express that the exhaust-gas flow is split up by the particle buffer storage device or the open structure into a multiplicity of small exhaust-gas flow parts, which are then conducted through the multiplicity of passages of the open structure. For this purpose, the particle buffer storage device is, in particular, positioned transversely or perpendicularly to the flow direction of the exhaust gas, and is accordingly impinged upon by flow, in particular over a large area. To that effect, the passages usually have only a very short extent in the flow direction. The open structure therefore has, in particular, a disk-shaped, plate-shaped construction. The number of passages is, in particular, more than 20, especially more than 100. An "open" structure means, in particular, that there are no flow dead ends, but rather flow can pass (rectilinearly and/or with (multiple) deflections) through the passages. In this case, an "open" structure is provided, in particular, if in a cross section or in every cross section through the structure perpendicular to the flow direction, there are more parts through which flow can freely pass than there are structure parts. In this case, comparing the areas to one another, an "open" structure is provided in particular when, in a cross section or in every cross section, the area percentage covered by the regions through which flow can freely pass is greater than 50%, in particular greater than 80%.

In accordance with an added feature of the invention, it is very particularly preferable for the at least one open structure to have a disk-shaped construction and to include at least one of the following elements: a grid, a fabric, a nonwoven, a foam or a honeycomb structure. A "disk-shaped" construction of the open structure is intended, in particular, to mean that the extent of the open structure in the direction of the flow direction of the exhaust gas is (considerably, in particular several times) smaller than its extent perpendicular thereto. The open structure may thus be constructed, for example, as a grid. A plurality of rods may be connected to one another for this purpose. In this case, the grid may be formed, for example, through the use of wires which are welded to one another, in the manner of a sieve. It is also possible for a fabric to be formed with such wires, in which case the wires not only rest on one another but rather are partially looped around one another. It is self-evident that it is also possible for a more or less chaotic or random configuration of the wires or wire filaments to be provided, such as is the case for example with a nonwoven. While it is the case with a nonwoven that the individual wires are, for example, welded to one another, a corresponding open structure may also be formed through the use of a foam, which likewise forms a chaotic channel system. A regular channel system may also be formed through the use of a honeycomb structure, for example with at least one smooth metal foil and at least one corrugated metal foil. It is likewise preferable for the disk-shaped open structure to be formed with an electrically conductive material, in particular metal. In general, it is also possible for a plurality of (identical or different) structures to be combined.

In accordance with an additional feature of the invention, it is proposed that the apparatus for generating an electric field includes a discharge electrode. It is self-evident that it is also possible for a plurality of discharge electrodes to be provided. The discharge electrode may be formed with correspondingly shaped individual electrodes, although it is also possible in this case to provide, for example, annular, disk-shaped or similar variants of a discharge electrode.

In accordance with yet another feature of the invention, it is considered advantageous for the particle separator to be electrically neutral and to include a wall-flow filter or a partial-flow filter. With regard to the possible configurations of a wall-flow filter and/or of a partial-flow filter, reference is made to the statements made in the introduction and to the description of the figures further below. The fact that the particle separator is electrically neutral has the effect that an intensified configuration of the particle agglomerates in the inlet region of the particle separator does not occur. A more uniform loading of the particle separator or of the filter material in the particle separator is attained as a result. The provision of a wall-flow filter and/or of a partial-flow filter makes it possible for a very large filter surface area to be accommodated in a small structural volume, in such a way that, in particular, the advantages over a centrifugal separator are obtained in this case.

With the objects of the invention in view, there is also provided a method for treating exhaust gas having particles. The method comprises the following steps:
a) charging the particles in an electric field;
b) supplying the electrically charged particles to a particle buffer storage device, through which the exhaust gas can flow, using electric attractive forces;
c) depositing the particles on top of each other at the particle buffer storage device forming particle agglomerates;
d) removing the particle agglomerates from the particle buffer storage device;

e) supplying the particle agglomerates to a particle separator; and f) converting the particle agglomerates in the particle separator.

The method may be realized, in particular, with the device according to the invention. The explanations made with regard to the device according to the invention should therefore also be consulted with regard to the method according to the invention.

An ionization of the particles, in particular soot, accordingly takes place in step a). It is basically possible for the particles to be provided either with a positive charge or with a negative charge, so that a corresponding electric field must be generated in each case. If appropriate, it is also possible in this case for different charges to be provided in the particles in an alternating fashion, for example by virtue of the electric field being changed after predefined time intervals.

The particles thus ionized are supplied, as per step b), to the particle buffer storage device, wherein due to the different electrical charges of the particles and of the particle buffer storage device, the particles from the exhaust gas are predominantly accumulated on the particle buffer storage device (due to electrostatic forces).

As a result, particles are deposited on top of each other on the particle buffer storage device and adhere to one another. In this case, van der Waals forces may act in addition to adhesive forces.

The particle buffer storage device is constructed or configured in such a way that the particles or particle agglomerates only very briefly adhere there, that is to say in particular no (complete) conversion of the particles takes place there. In fact, due to the frontal impingement of flow on the particle buffer storage device, the exhaust-gas entrains the particle agglomerates again and conducts them to the downstream particle separator, where the particle agglomerates are accumulated until the regeneration of the particle separator, and are finally converted. In this case, the conversion may take place continuously and/or discontinuously.

In accordance with another mode of the method of the invention, it is particularly preferable for the particle agglomerates to be supplied to the particle separator in an electrically neutralized state. In other words, this means for example that the particle buffer storage device is coupled to an electrical pole (potential), in such a way that the electrical charge of the particles is neutralized when the particles come into contact with the particle buffer storage device. The particle agglomerates then flowing to the particle separator therefore follow the "usual" flow paths of the exhaust gas, in such a way that in particular, electrostatic effects no longer play a (significant) role in the accumulation of the particle agglomerates in the particle separator. It is therefore possible to resort to conventional concepts for the construction or configuration of the particle separator.

In accordance with a further mode of the invention, it may be advantageous if step d) takes place only through the use of the exhaust-gas flow. That is to say, an active actuation of the particle buffer storage device or of other external measures is not required to return the particle agglomerates to the exhaust-gas flow. That is to say also, that the particle agglomerates are removed again by the exhaust-gas flow alone. Taking into consideration the desired size of the particle agglomerates, it is basically possible for the particle buffer storage device to be constructed correspondingly, for example by providing large flow impingement surfaces, suitable (smooth) surfaces, etc.

In accordance with an added mode of the method of the invention, it is very particularly preferable if, in the exhaust gas upstream and downstream of the particle buffer storage device, the average mass of particles in the exhaust gas is the same, but the average number of particles downstream of the particle buffer storage device is lower. This means, in particular, that the particle buffer storage device in fact serves practically only to form particle agglomerates, that is to say (averaged over time) the mass of particles supplied to the particle buffer storage device is approximately the same as that ultimately exiting the particle buffer storage device. As a result of the targeted accumulation of the particles on top of each other to form large particle agglomerates, the number of particles is, however, reduced, and the particle size is increased. It is consequently preferable for the particle agglomeration device to in fact only agglomerate particles by virtue of the particles being ionized and then combined.

With the objects of the invention in view, there is concomitantly provided a motor vehicle, comprising an internal combustion engine with an exhaust system in which a device according to the invention is provided. The device is configured in such a way that the method according to the invention can be carried out. The motor vehicle is, in particular, a passenger motor vehicle or a heavy goods vehicle or truck, in particular having a diesel engine.

Other features which are considered as characteristic for the invention are set forth in the appended claims, noting that the features and steps specified individually in the claims may be combined with one another in any desired technologically expedient manner and form further embodiments of the invention.

Although the invention is illustrated and described herein as embodied in a device and a method for treating exhaust gas containing particles and a motor vehicle having the device and performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
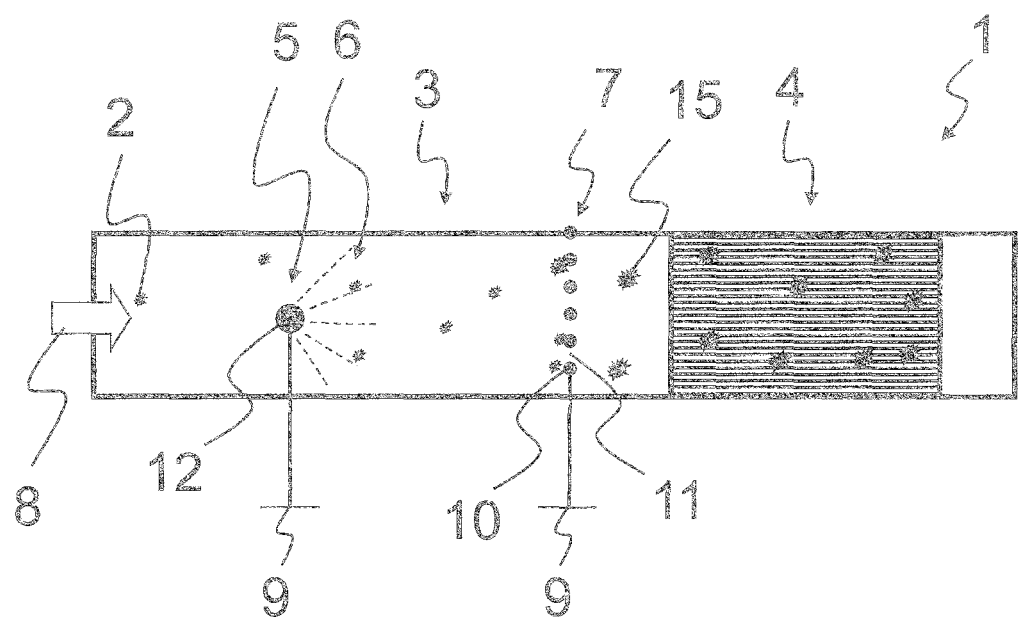
FIG. 1 is a diagrammatic, longitudinal-sectional view of a structural variant of a device according to the invention.

Referring now in detail to the figures of the drawing for explaining the invention and the technical field in more detail by showing particularly preferred structural variants to which the invention is not restricted, and first, particularly, to FIG. 1 thereof, there is seen a preferred structural variant of a device according to the invention and of a method according to the invention. In this case, exhaust gas flows into a device 1 according to the invention in a flow direction 8. There, the exhaust gas flows firstly into a particle agglomeration device 3. In this case, the particle agglomeration device 3 includes an apparatus 5 for generating an electric field 6. The apparatus 5 illustrated herein is in the form of a discharge electrode 12 which is connected to an electrical (negative) pole 9. The particles 2 are ionized in the electric field 6, that is to say they are provided with an electrical charge, and they flow onward in the flow direction 8 to a particle buffer or intermediate storage device 7 through which the exhaust gas can flow. The particle buffer storage device 7 is likewise connected to an electrical (positive) pole 9, wherein the latter opposes the electrical pole 9 of the discharge electrode 12. The ionized particles 2 are thus deposited on the surface of the particle buffer storage device 7, wherein a plurality of particles 2 impact against one another and adhere to one another. The particle buffer storage device 7 is constructed in this case as an open structure 10 with a multiplicity of passages 11, in such a way that the exhaust gas, as it flows through the open structure 10, entrains particle agglomerates 15 which have grown to a large size. The exhaust-gas flow thus conducts the now considerably larger particle agglomerates 15 to a particle separator 4 which, as viewed in the flow direction 8 of the exhaust gas, is positioned downstream of the particle buffer storage device 7. The particle agglomerates 15 are accumulated and converted, for example continuously, through the use of nitrogen dioxide ($NO_2$), in the particle separator 4.

Figure 2:
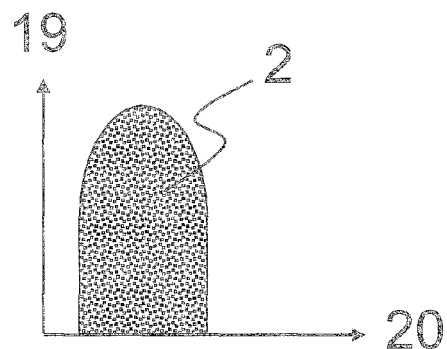
FIG. 2 is a diagram showing a particle distribution upstream of an entry into a particle agglomeration device.
Figure 3:
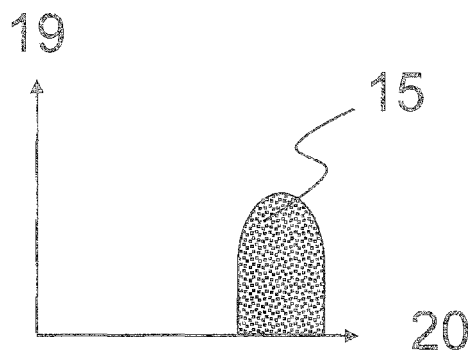
FIG. 3 is a diagram showing a particle distribution downstream of an exit from the particle agglomeration device.

FIGS. 2 and 3 are intended to respectively diagrammatically illustrate a particle distribution present in the exhaust-gas flow upstream and downstream of the particle agglomeration device 3. In this case, an average particle size 20 is plotted on the abscissa, and a particle count 19 is plotted on the ordinate. It can be seen from FIG. 2 that the average particle distribution is positioned further to the left on the abscissa, that is to say in this case, a large number of small particles 2 is entrained in the exhaust-gas flow. After exiting from the particle agglomeration device 3, it can be seen that the particle distribution lies further to the right on the abscissa, that is to say larger particle sizes 20 are present in this case. The number of particles has also decreased considerably, because the particle agglomerates 15 have been formed from the combination of a plurality of particles 2. It is basically generally realized in this case that the total mass of particles upstream and downstream of the particle agglomeration device 3 is substantially the same.

Figure 4:
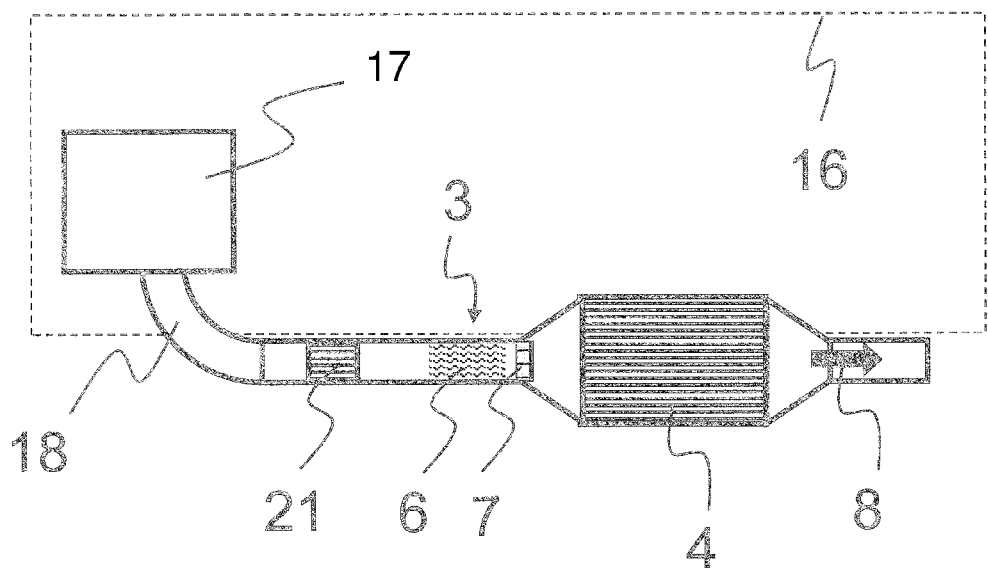
FIG. 4 is an elevational view of a motor vehicle having an exhaust system.

FIG. 4 diagrammatically illustrates a motor vehicle 16 having an internal combustion engine 17, for example a diesel engine. A corresponding exhaust system 18 for eliminating undesired pollutants and particles in the exhaust gas is provided for the internal combustion engine 17. A catalytic converter 21, the particle agglomeration device 3 and the particle separator 4 are illustrated along the flow direction 8 of the exhaust gas in the exhaust system 18. It is self-evident that it is also possible for further exhaust-gas treatment units to be provided or added therein. The particle agglomeration device 3 is again diagrammatically illustrated as being formed with an electric field 6 and a downstream particle buffer storage device 7. In this case, it is possible, in particular, for a continuous regeneration of the particle separator 4 to be provided if the catalytic converter 21 is capable of converting the nitrogen oxide contained in the exhaust gas into nitrogen dioxide and thus a corresponding conversion of soot can be realized in the particle separator 4.

Figure 5:
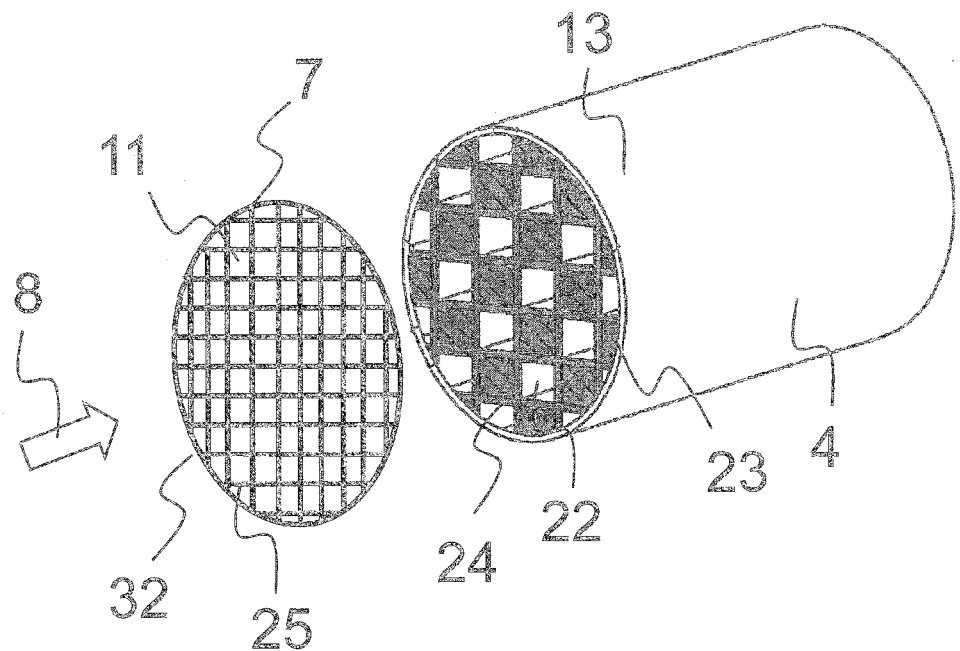
FIG. 5 is a perspective view of a further structural variant of the device according to the invention.

FIG. 5 is a partially perspective illustration showing a structural variant of a particle buffer storage device 7 in combination with a particle separator 4 in the form of a wall-flow filter 13. In this case, the exhaust gas with the ionized particles 2 flows in the flow direction 8 to the particle buffer storage device 7. The particle buffer storage device 7 is constructed in this case in the form of a grid 32, having a multiplicity of wires 25 connected to one another so as to form a multiplicity of passages 11. In this case, the passages 11 are so large that it is not possible for soot particles to be filtered out, that is to say the passages 11 are several times larger than the particles 2 and the particle agglomerates 15. A plurality of particles 2 now adhere to one another on the particle buffer storage device 7, are finally entrained by the exhaust-gas flow and are carried along to the particle separator 4, which is in the form of the wall-flow filter 13. The wall-flow filter 13 is distinguished by a multiplicity of channels 22. The channels have a respective closure 23 at two end sides in an alternating fashion. The exhaust gas thus entering on one side is forced through a porous wall 24 into a neighboring channel, in such a way that the entire exhaust-gas flow is forced through the porous wall. Since only relatively large particle agglomerates now need to be filtered out, the wall 24 of the wall-flow filter 13 may have relatively large pores or high porosity without the high filtration efficiency of the device being reduced. This, however, also has the result that the pressure loss across the particle separator 4 can be considerably reduced.

Figure 6:
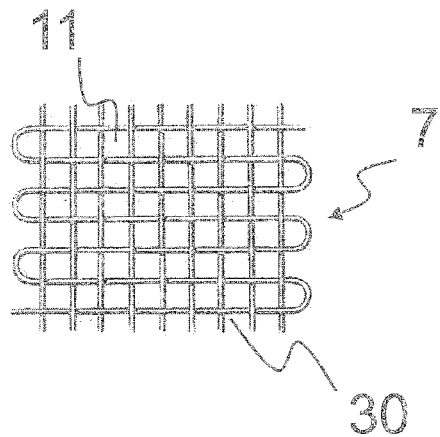
FIG. 6 is a fragmentary, elevational view of a structural variant of a particle buffer storage device.
Figure 7:
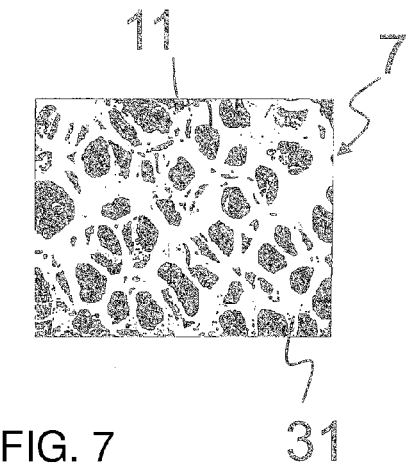
FIG. 7 is an elevational view of a further structural variant of a particle buffer storage device.
Figure 8:
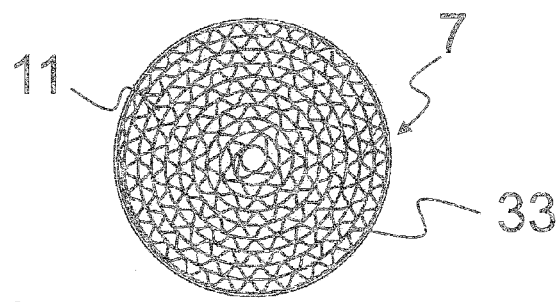
FIG. 8 is an end-elevational view of yet a further variant of a particle buffer storage device.

Other structural variants for the particle buffer storage device 7 are shown in FIGS. 6 to 8. A particle buffer storage device 7 is shown in FIG. 6 in the form of a fabric 30, in FIG. 7 in the form of a (metallic) foam 31 and in FIG. 8 in the form of a disk-shaped honeycomb structure 33 having at least partially corrugated metal foils. All of the structural variants form an open structure 10.

Figure 9:
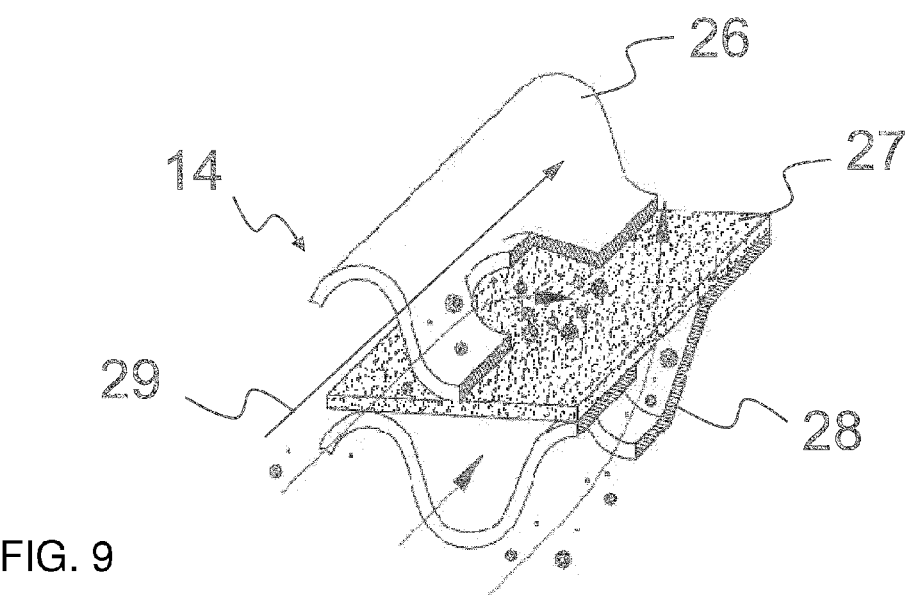
FIG. 9 is a fragmentary, perspective view of a particle separator in the form of a partial-flow filter.

FIG. 9 is a fragmentary view illustrating the mode of operation of a partial-flow filter 14. In this case, the partial-flow filter 14 is formed with corrugated metal foils 26 and smooth metallic nonwovens 27, which are disposed in an alternating fashion in such a way that they delimit common channels in each case. Diversions 28 are provided in the metal foil 26 in such a way that at least a part of the exhaust-gas flow is moved toward the nonwoven 27. In this case, the diversions 28 are, however, not so large as to block the entire channel cross section. In fact, it is possible for a part of the exhaust gas in the channel to flow past the diversion 28, in a so-called partial flow 29. It is preferable for a plurality of such diversions 28 to be provided over the length of the channel, in such a way that the exhaust-gas flow is diverted multiple times and therefore the probability of a flow passing through a nonwoven 27 is high.

The invention claimed is:

1. A device for treating exhaust gas having particles, the device comprising:
    an electrically neutral particle separator being a wall-flow filter or a partial-flow filter; and
    a particle agglomeration device positioned upstream of said particle separator in exhaust gas flow direction;
    said particle agglomeration device having at least one apparatus configured to generate an electric field and provide the particles with a charge and said particle agglomeration device having a particle buffer storage device through which the exhaust gas can flow;

said particle buffer storage device being connected to an electrical pole having a charge opposing the charge of the particles, said particle buffer storage device having at least one open structure with a multiplicity of passages and said particle buffer storage device configured:

to cause the particles to be deposited in a targeted manner on said particle buffer storage device due to an electric field, to cause the particles to come to rest on top of each other and increase in size due to a tendency of the particles to adhere to one another, and to cause the particles after having reached a desired size on said particle buffer storage device to be entrained again by the exhaust gas and supplied to said particle separator disposed downstream of said particle buffer storage device.

2. The device according to claim 1, wherein said at least one open structure has a disk-shaped construction and includes at least one of a grid, a fabric, or a nonwoven.

3. The device according to claim 1, wherein said apparatus for generating an electric field includes a discharge electrode.

4. A method for treating exhaust gas having particles, the method comprising the following steps:
 a) charging the particles in an electric field;
 b) supplying the electrically charged particles to a particle buffer storage device connected to an electrical pole having a charge opposing the charge of the particles and having at least one open structure with a multiplicity of passages through which the exhaust gas can flow, using electric attractive forces;
 c) depositing the particles on top of each other at the particle buffer storage device forming particle agglomerates;
 d) removing the particle agglomerates from the particle buffer storage device;
 e) supplying the particle agglomerates to an electrically neutral particle separator being a wall-flow filter or a partial-flow filter; and
 f) converting the particle agglomerates in the particle separator.

5. The method according to claim 4, which further comprises supplying the particle agglomerates to the particle separator in an electrically neutralized state.

6. The method according to claim 4, which further comprises carrying out step d) only through the use of the exhaust-gas flow.

7. The method according to claim 4, wherein the particle buffer storage device causes the exhaust gas to have the same average mass of particles upstream and downstream of the particle buffer storage device but a lower average number of particles downstream of the particle buffer storage device.

8. A motor vehicle, comprising:
 an internal combustion engine; and
 an exhaust system connected to said internal combustion engine and having a device according to claim 1.

9. A motor vehicle, comprising:
 an internal combustion engine; and
 an exhaust system connected to said internal combustion engine and having a device configured to carry out the method according to claim 4.

10. The device according to claim 1, wherein said at least one open structure has a cross section and regions through which a flow can freely pass, said regions covering an area percentage of said cross section of greater than 50%.

11. The device according to claim 10, wherein said regions cover an area percentage of said cross section of greater than 80%.

12. The device according to claim 1, which further comprises a catalytic converter disposed upstream of said particle agglomeration device and configured to convert nitrogen oxide contained in the exhaust gas into nitrogen dioxide and to provide continuous regeneration of said particle separator and corresponding conversion of soot.

13. The device according to claim 1, wherein the exhaust gas is exhaust gas from a diesel engine.

14. The method according to claim 4, which further comprises providing the at least one open structure with a cross section and regions through which a flow can freely pass, the regions covering an area percentage of the cross section of greater than 50%.

15. The method according to claim 14, wherein the regions cover an area percentage of the cross section of greater than 80%.

16. The method according to claim 4, which further comprises providing a catalytic converter upstream of the particle agglomeration device, converting nitrogen oxide contained in the exhaust gas into nitrogen dioxide, continuously regenerating the particle separator and correspondingly converting soot.

17. The method according to claim 4, which further comprises supplying the exhaust gas from a diesel engine.

18. The method according to claim 4, wherein the at least one open structure has a disk-shaped construction and includes at least one of a grid, a fabric, or a nonwoven.

* * * * *